US009799154B2

(12) United States Patent
Engel-Dahan et al.

(10) Patent No.: US 9,799,154 B2
(45) Date of Patent: Oct. 24, 2017

(54) ELECTRONIC KEY, ELECTRONIC CLOSURE SYSTEM AND A METHOD FOR ALLOWING AN ACCESS AUTHORIZATION

(71) Applicant: Lock Your World GmbH & Co. KG, Bad Orb (DE)

(72) Inventors: Manuela Engel-Dahan, Bad Orb (DE); Ralf Knobling, Schoeneck (DE); Thilo Meisel, Darmstadt (DE)

(73) Assignee: Lock Your World GmbH & Co. KG, Bad Orb (DE)

( * ) Notice: Subject to any disclaimer, the term of this patent is extended or adjusted under 35 U.S.C. 154(b) by 0 days.

(21) Appl. No.: 14/524,422

(22) Filed: Oct. 27, 2014

(65) Prior Publication Data

US 2015/0145647 A1 May 28, 2015

Related U.S. Application Data

(63) Continuation of application No. PCT/EP2013/058827, filed on Apr. 27, 2013.

(30) Foreign Application Priority Data

Apr. 27, 2012 (DE) ........................ 10 2012 008 395

(51) Int. Cl.
*G05B 19/00* (2006.01)
*G07C 9/00* (2006.01)

(52) U.S. Cl.
CPC ...... *G07C 9/00111* (2013.01); *G07C 9/00571* (2013.01); *G07C 9/0069* (2013.01);
(Continued)

(58) Field of Classification Search
CPC .. G07C 2009/0023; G07C 2009/00238; G07C 9/00111; G07C 9/00174; G07C 9/00309
(Continued)

(56) References Cited

U.S. PATENT DOCUMENTS 5,749,253 A * 5/1998 Glick ...................... E05B 47/00 257/E29.081
6,710,700 B1 * 3/2004 Tatsukawa ............. B60R 25/04 340/5.52
(Continued)

FOREIGN PATENT DOCUMENTS

CN 101446149 A 6/2009
DE 20 2011 003043 U1 4/2011
(Continued)

OTHER PUBLICATIONS

Lock Your World; Lockyourworld: Pylocx Rohrtresor von Lock Your World= Video "keysafe" in English language; Oct. 19, 2011, cited in the International Search Report, Retrieved from the Internet : URL:http://www.youtube.com/watch?v+yfGQjyg00jy.
(Continued)

*Primary Examiner* — Carlos E Garcia
(74) *Attorney, Agent, or Firm* — Reinhart Boerner Van Deuren P.C.

(57) ABSTRACT

The invention relates to an electronic key (32) having at least two contacts (324, 325, 326) for the transmission of data and/or energy to an electronic lock (16). In accordance with the invention, the housing (321) of the electronic key (32) comprises an input device (33) for the entry of an authorization code (36). The invention also relates to an electronic closure system with an electronic key (32) and an electronic lock (16) as well as to a method for secure acquisition of an access authorization or for secure delivery of a key to at least one user (22) by means of an electronic lock (16) and at least one electronic key (32) carried by the user (22).

13 Claims, 5 Drawing Sheets

Figure 6:
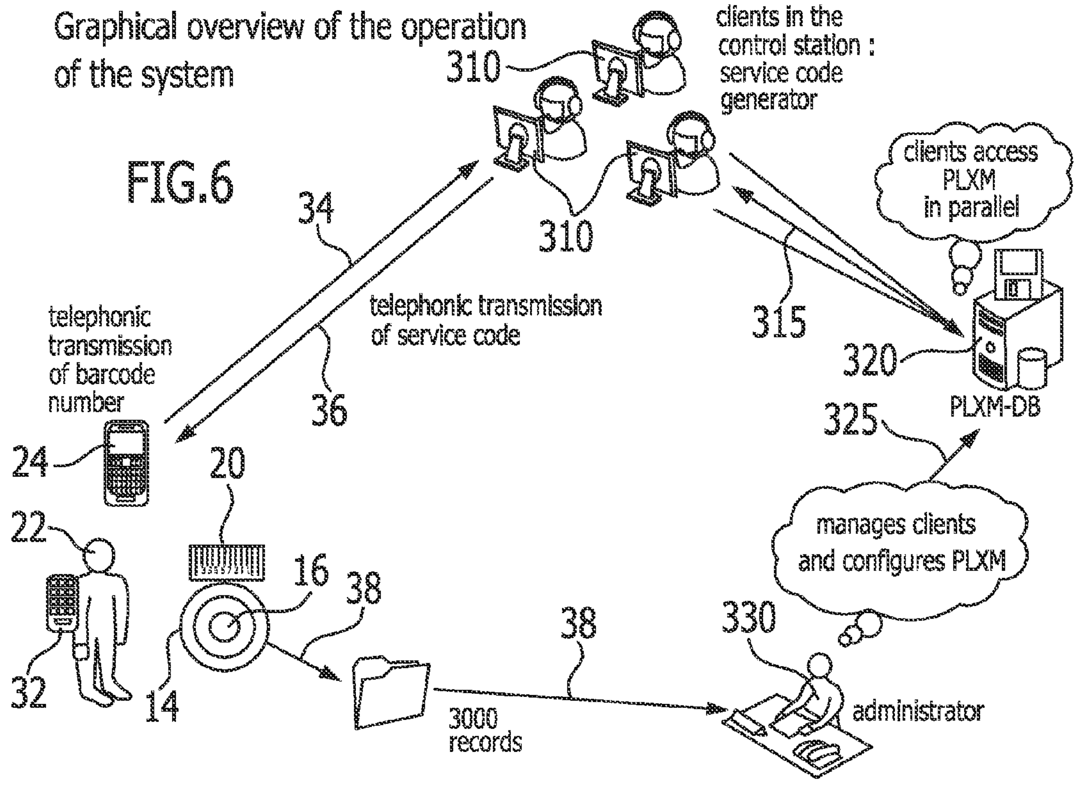

(52) U.S. Cl.
CPC ..... *G07C 9/00182* (2013.01); *G07C 9/00912* (2013.01); *G07C 2009/00634* (2013.01); *G07C 2009/00761* (2013.01); *G07C 2009/00936* (2013.01)

(58) Field of Classification Search
USPC ................ 340/5.1, 5.2, 5.6, 5.61, 5.64, 5.74
See application file for complete search history.

(56) References Cited

U.S. PATENT DOCUMENTS

| | | | | |
|---|---|---|---|---|
| 7,123,127 | B2 | 10/2006 | Mosgrove et al. | |
| 8,058,971 | B2 * | 11/2011 | Harkins ............ | G07C 9/00103 340/5.2 |
| 8,797,138 | B2 * | 8/2014 | Myers ................ | G07C 9/00571 340/5.7 |
| 9,024,720 | B2 * | 5/2015 | Bliding .............. | G07C 9/00103 340/5.61 |
| 2003/0179075 | A1 * | 9/2003 | Greenman .......... | E05B 19/0005 340/5.54 |
| 2006/0170533 | A1 * | 8/2006 | Chioiu ............... | G07C 9/00103 340/5.61 |
| 2011/0291798 | A1 | 12/2011 | Schibuk | |
| 2013/0099892 | A1 * | 4/2013 | Tucker ............... | G07C 9/00309 340/5.61 |
| 2014/0062655 | A1 * | 3/2014 | Colburn ............ | G07C 9/00309 340/5.61 |
| 2015/0181014 | A1 * | 6/2015 | Gerhardt ............ | G07C 9/00309 455/420 |

FOREIGN PATENT DOCUMENTS

| | | | |
|---|---|---|---|
| WO | WO 2004/077848 | A2 | 9/2004 |
| WO | WO 2009/128854 | A1 | 10/2009 |

OTHER PUBLICATIONS

Lock Your World secure.easy.stable; cited in the International Search Report , 19 pages; Dec. 5, 2011.

* cited by examiner

FIG.1
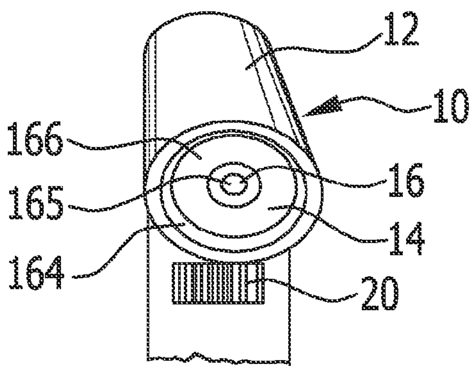
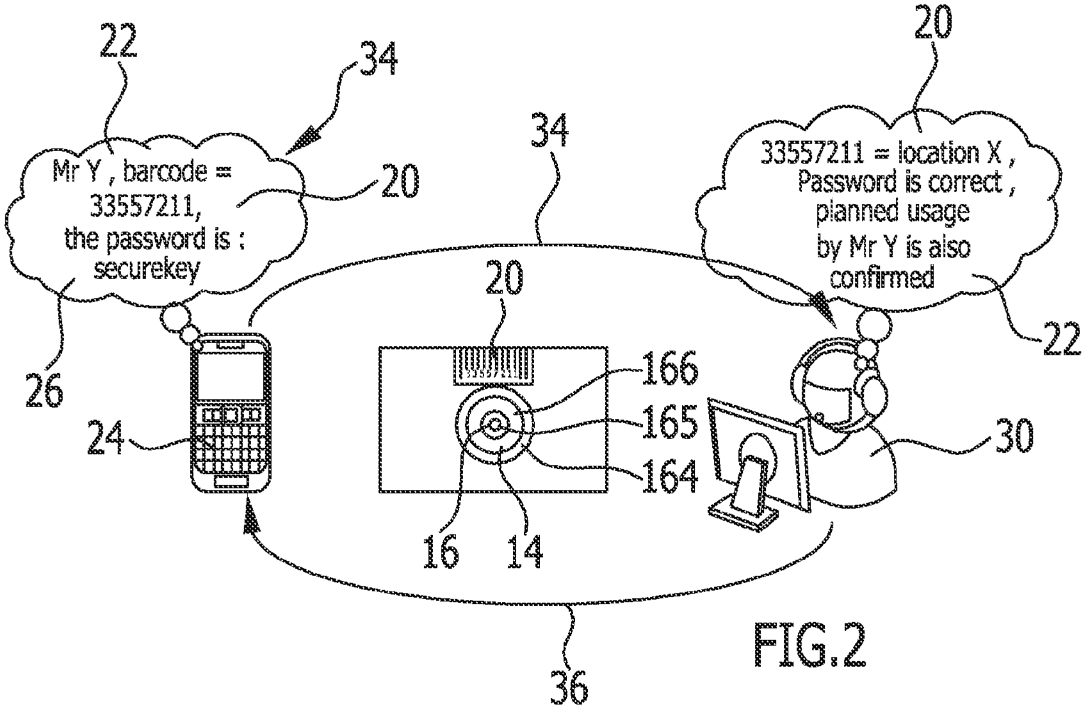
FIG.2
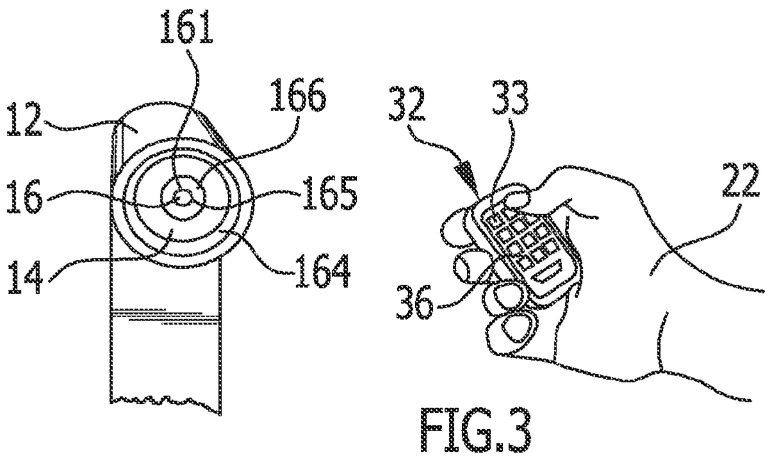
FIG.3

FIG.4
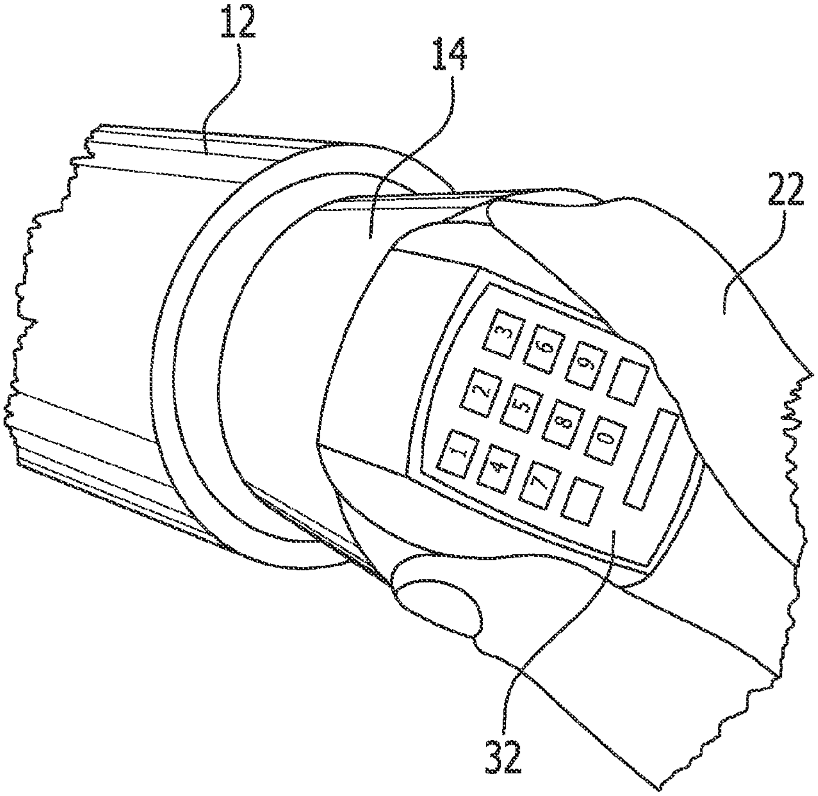
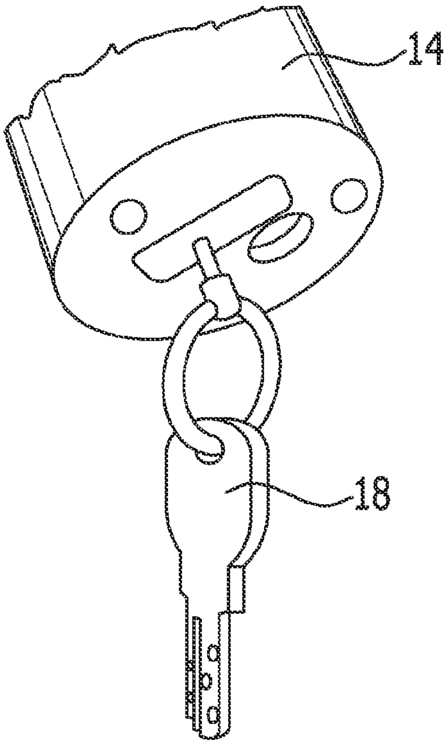
FIG.5

ELECTRONIC KEY, ELECTRONIC CLOSURE SYSTEM AND A METHOD FOR ALLOWING AN ACCESS AUTHORIZATION

CROSS REFERENCE TO RELATED PATENT APPLICATION

This application is a continuation of international application No. PCT/EP2013/058827 filed on Apr. 27, 2013.

This patent application claims the benefit of international application No. PCT/EP2013/058827 of Apr. 27, 2013 and German application number 10 2012 008 395.5 of Apr. 27, 2012, the teachings and disclosure of which are hereby incorporated in their entirety by reference thereto.

The invention relates to an electronic key in accordance with the first part of claim 1, an electronic closure system in accordance with the first part of claim 8 and also a method for secure acquisition of an access authorization or for secure delivery of a key in accordance with the first part of claim 13.

In particular for external security agencies and also a company's own personnel, the problem exists that the carrying of a key and especially a master key providing access to all areas of a building represents a serious security risk should this key get into wrong hands due to misuse or as a result of criminal activity (theft, robbery or kidnapping, illegal production of a duplicate key).

From DE 10 2005 033 898 A1, there is known a method and a device for granting access authorization to a dwelling. There, a signal, which is generated in response to a telephonic request sent by a user by radio in which the user transmits a code, is sent from a service station to a telemetry module of an intercom system which grants the entitled user access to the entry door of a building and subsequently to the door of a dwelling.

From DE 20 2011 003 043 111, there is known an electronic contact arrangement with three contacts, a matching plug or key and a magnetic arrangement for centering the plug on the contact arrangement.

The object of the invention is to provide an electronic key which is adapted to be activated on a short term basis and changeable for opening a variety of locks. Furthermore, the object includes the provision of an electronic closure system in which an electronic key in accordance with the invention advantageously cooperates with at least one electronic lock. Finally, the object also consists in the provision of a method for secure acquisition of an access authorization or for secure delivery of a key using an electronic key in accordance with the invention and/or a closure system in accordance with the invention.

In regard to the electronic key, this object is achieved by the features indicated in claim 1, in regard to the electronic closure system by the features indicated in claim 8 and in regard to the method by the features of claim 13. Advantageous embodiments of the invention are contained in the respectively related appendant Claims.

An electronic key in accordance with the invention is characterized by an input device for entering an authorisation code which is provided on a housing of the electronic key. In connection therewith, the input device can be in the form of a numeric or alphanumeric keyboard, whereby, in this case, the authorisation code for the desired activation process can be entered manually by the user. In accordance with a further aspect of the invention, the electronic key is programmable by means of authorisation codes for opening different electronic locks which are adapted to be entered by means of the input unit.

As an alternative or in addition thereto, the input device may also be in the form of an electronic data capturing device. For example, this could be a reading or receiving device which captures an authorisation code transmitted by the user or by a user's hand-held communication device (e.g. a smartphone) by radio, Bluetooth, RFID or NFC communication systems or by using an optical transmission process e.g. a bar code, a QR code or the like.

The authorisation code is preferably buffered in a memory of the electronic key and, after this has been brought into contact with an electronic lock, is transmitted thereto via at least one contact.

An electronic lock in the context of this invention is any electronic contact arrangement which is suitable for a subsequent actuation or release of an access authorization.

The authorisation code which is adapted to be entered separately into the electronic key by means of the input device without spatial proximity to the electronic lock requiring opening substantially increases security in regard to the authentication of the access authorization since the corresponding access data can hardly be intercepted by a non-legitimate third party and the electronic key is only brought near the electronic lock after the authorisation code has already been entered.

In the event of a stolen or lost electronic key, this is worthless to the thief or the finder since he cannot identify which electronic lock the key concerned has been prepared for by the authorisation code.

The input device and the contacts are preferably arranged on different sides of the housing. Particularly preferable is that the input device be arranged on a front face of the housing and the contacts on a rear face of the housing. The input device can thereby be operated very easily in a position in which the contacts engage with the corresponding mating contacts on the electronic lock.

It is particularly preferably that the electronic key be provided with at least one electrical voltage supply—preferably with a rechargeable accumulator—which serves not only for powering the electronic components of the electronic key, but over and above that, it also serves for powering the electronic lock at least during the opening process or during an initialisation or activation process in the course of which the electronic lock can be connected to its own voltage supply. To this end if necessary, the electronic key is preferably provided with an electrical voltage converter by means of which a smaller output voltage of the accumulator in the electronic key is converted into the higher operating voltage which is needed by the electronic lock. For example, the electrical voltage converter is in the form of a DC/DC converter which converts an input voltage of e.g. 3.7 V of a rechargeable lithium ion battery serving as an accumulator into an output voltage of 12 V which is sufficient to activate most conventional motor locks or electrical actuators.

The advantage is that the device fitted with the electronic lock does not have to be supplied constantly with an operating voltage as the current required to open it is only supplied as and when necessary by the electronic key. Thus for example, tubular key safes located far away from mains electricity in which physical keys are deposited can be operated completely without a fixed current supply and even without replaceable batteries. Thus maintenance costs and wear in these systems are reduced.

Lockers, safe-deposit boxes or safes can likewise be operated without the need for a continuous voltage supply since the current for initialising the access process is supplied by the electronic key. Optionally thereby, after confirmation of the authentication of the access authorization, the electronic lock initially activates a control device by means of which an external operating voltage source for actuating a motor lock or some other type of actuator is activated.

The electronic key is preferably provided with at least one magnet—in particular a ring magnet—for a centering process which is effected in cooperation with a corresponding mating magnet on the electronic lock. Due to the attracting magnetic forces, the electronic key is automatically moved into the contact position as it approaches the electronic lock.

For the purposes of ensuring secure contact, the contacts on the electronic key are preferably spring mounted in the key housing.

Apart from the electronic key, an electronic closure system comprises at least one electronic lock which is provided with at least two concentrically arranged mating contacts and a magnetic centering arrangement.

In accordance with one advantageous application of an electronic closure system, the electronic lock is arranged on a closure cap of a tubular key safe, whereby the electronic key preferably serves simultaneously as a handle for actuating the closure cap when the key is in its contact position with the electronic lock.

In accordance with an alternative application of an electronic closure system, the electronic lock is connected in series with a motor lock or an actuator of a device that is to be secured and activates the supply of power thereto. As already mentioned, lockers, safe-deposit boxes or safes can be operated thereby without the need for a continuous voltage supply since the current for initialising an access process is supplied by the electronic key. Optionally thereby, after confirmation that the access authorization is authentic, the electronic lock firstly actuates a control device by means of which an external source of operating voltage for actuating a motor lock or any other actuator is then activated.

The mating contact surfaces on the electronic lock are preferably in the form of concentric circles which come into contact with the contacts of the electronic key at any relative angular position of the electronic key. Since no form of rotational alignment of the electronic key with respect to the electronic lock is required, it is extremely easy for the user to dock the electronic key on the electronic lock even when viewing conditions are poor.

A method in accordance with the invention for secure acquisition of an access authorization or for secure delivery of a key for at least one user by means of an electronic lock and at least one electronic key carried by the user in accordance with the invention and/or by means of a closure system in accordance with the invention is characterized by the following process steps:

- transmittal of at least one item of information (20; 22; 34) characteristic of the electronic lock (16) and/or the user (22) to a central data processing centre (30) that is remote from the electronic lock (16) by means of a communication device (24),
- examination of the sent information (20; 22; 34) by the central data processing centre (30),
- transmittal of an authorisation code (36) to the user (22) by means of the communication device (24) in the case of a positive examination of the information (20; 22; 34),
- entry of the authorisation code (36), by the user (22) by means of the input device (33), into the carried electronic key (32),
- unlocking of the electronic lock (16) in cooperation with the electronic key (32).

A high level of security is provided by the examination of an item of information characteristic of the electronic lock such as a code that is arranged in the region of the lock and is adapted to be machine read by means of a communication device or to be read out manually by the user for example, and an item of information characteristic of the user such as an e.g. password or a letter/number combination that is entered into the communication device and sent by means of a communication device to a central data processing centre located remote from the lock where these items of information are examined. The access authorization is not checked and granted locally in the region of the electronic lock that is to be opened but rather, in the data processing centre located remotely therefrom.

After the grant and transmittal of the authorisation code, this is communicated to an electronic key carried by the user, and the unlocking of the electronic lock is then effected thereby. The communication of the authorisation code to the electronic key represents a further advantageous security barrier. As an alternative to manual entry of the communicated authorisation code into the electronic key by means of an input device, the communication of the authorisation code could also be effected automatically such as by a transmission from the communication device to the electronic key by means of Bluetooth, an infrared transmitter or other close range transmission processes for example.

The electronic lock itself can thereby enable access authorization to a protected region or a protected device. In an alternative embodiment however, the protected region is formed by a relatively small burglar-proof container such as a tubular key safe for example which is located on the outside of a building or in the vicinity of the building. After being unlocked by the electronic key, the electronic lock then gives access to a physical key in this tubular key safe by means of which entry to the building can then be made. Hereby, the physical key is connected in particularly advantageous manner to the inside of a closure cap for the tubular key safe which contains the electronic lock so that its return to the tubular key safe after leaving the building necessarily ensures relocking of the tubular key safe by means of the closure cap.

In accordance with a further advantageous application, after an authentication check has been effected, the electronic lock receives a voltage provided by the electrical voltage supply of the electronic key—optionally changed by means of a voltage converter—and passes it on to an electrical motor lock or an electrical actuator, optionally through the intermediary of a control device, for the purpose of activating it.

In a particularly simple form, the communication device is formed by a mobile telephone by means of which the user—a guard for a security agency for example—calls the data processing centre—the service centre of the security agency for example—and conveys his name, an item of information specific to the lock and a password, whereupon the data processing centre examines these items of information, possibly comparing them additionally with a work schedule that has been stored there, and transmits an authorisation code to the user or the communication device upon positive evaluation of all the items of information. The authorisation code can be communicated to the user by telephone or even by means of short text message (SMS) generated by a computer in the data processing centre.

The user passes on this authorisation code via the input device to the electronic key he is carrying and can then actuate the electronic lock by bringing the electronic key into contact with the electronic lock or by means of a contact-less signal transmission system such as radio for example.

Commencing from this particularly simple form, one or more of these steps can be effected automatically. Thus, for example, the code of the electronic lock can be read out automatically by means of software ("App") stored in the communication device and corresponding sensors—for example a camera of a smartphone serving as a communication device. This can be effected for example by means of a bar code reading program or Aztec code reading program stored in the smartphone and for this purpose in these cases, a suitable graphic code is arranged in the region of the electronic lock. However it is also equally possible for other types of electronic signal generator to be arranged in the region of the electronic lock and for corresponding sensors in the communication device to be trained upon them, for example an invisible, magnetic coded signal.

The authorisation code can also be conveyed to the smartphone of the user in the form of a bar code, QR code or the like. In the event that the code being conveyed is conveyed in machine-readable form then it is transmitted by the communication device (the smartphone) to an electronic input device on the electronic key.

The item of information characteristic of the user can also be retrieved automatically by the software stored in the communication device after reading the item of information specific to the electronic lock for example and then entered by the user as a letter/number combination for example and transmitted to the data processing centre.

As a further advantageous process step, prior to the transmittal of an authorisation code to the user, provision is made for the data processing centre to examine not only the items of information characteristic of the lock and/or the user but also an item of information concerning the place of use and/or the time of use that is linked to both items of information by a work schedule. Thereby an additional level of security is created since this excludes the possibility of an access code being transmitted should it fall completely outside a normally envisaged route taken by a security guard.

A further advantageous embodiment of the invention envisages that the electronic lock and/or the device protected thereby send an item of information to the central data processing centre upon the release and closure of the electronic lock.

An advantageous development of the system envisages that the examination in the central data processing centre further comprise the evaluation of at least one time parameter which verifies the item of information characteristic of the lock and/or the user on the basis of a deposited timetable—in particular the route plan of a watchman—for the planned opening of the lock.

In a special embodiment, provision may be made for the communication device and the electronic key to form a unit. This unit combines all the functions of a transmitter and receiver for collecting and transmitting the items of information characteristic of the lock and/or the user to a central data processing centre and for receiving an authorisation code with the function of the electronic key. By means of the received authorisation code, the electronic key such as a magnetic transponder for example is programmed in such a way that it is usable for opening the electronic lock.

The present invention is useable for example in connection with a tubular key safe such as is disclosed in WO 2012/045474 A1 for example. In connection therewith, after being placed on the electronic lock, the transponder acting as an electronic key serves directly as a handle for removing the closure cap.

Figure 7:
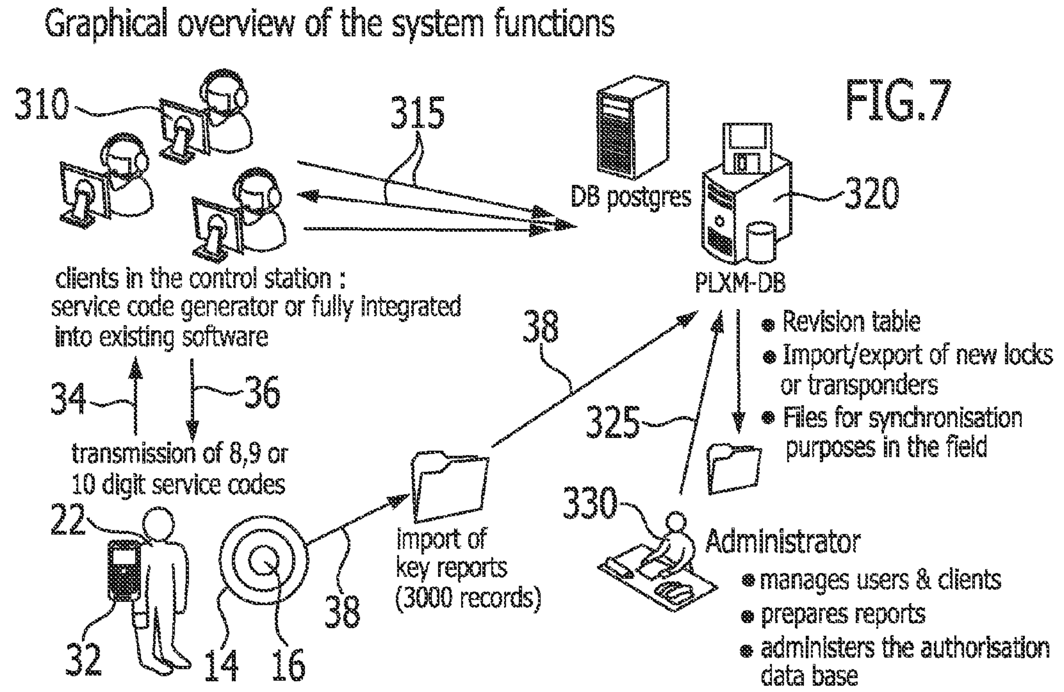
Figure 8:
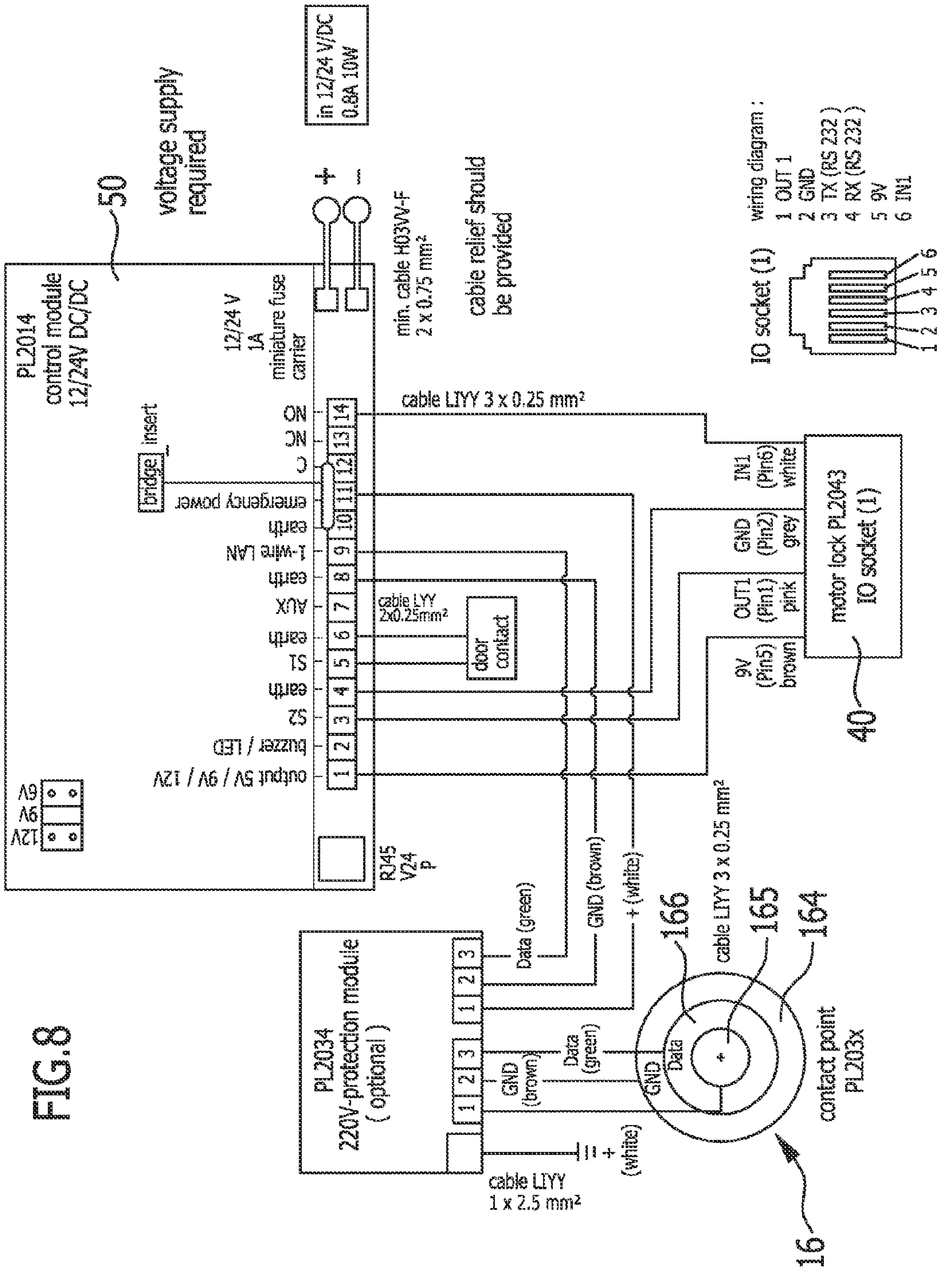
Figure 10:
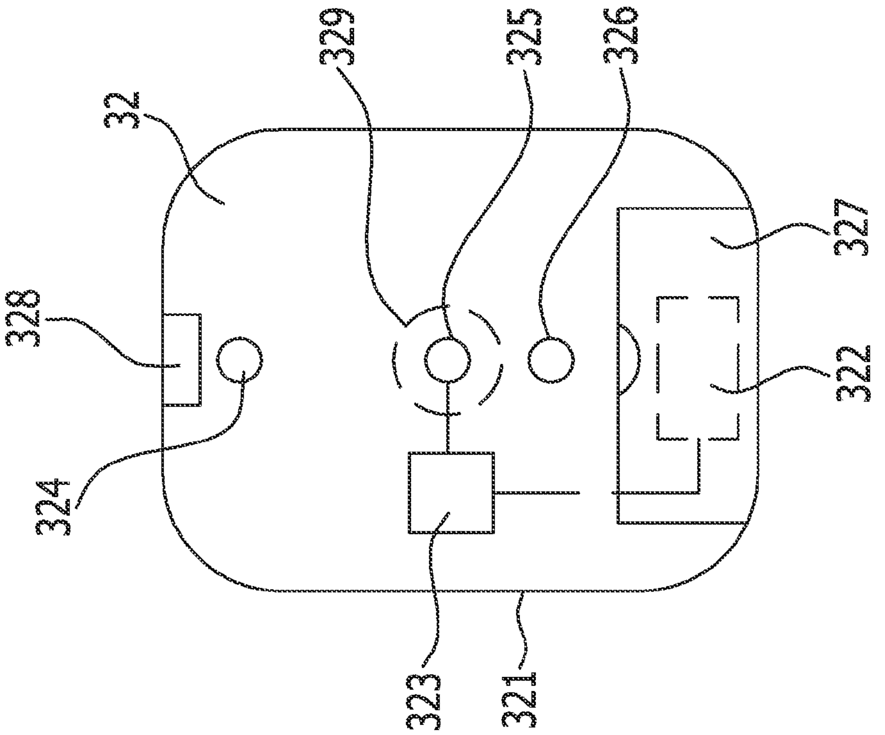
Figure 9:
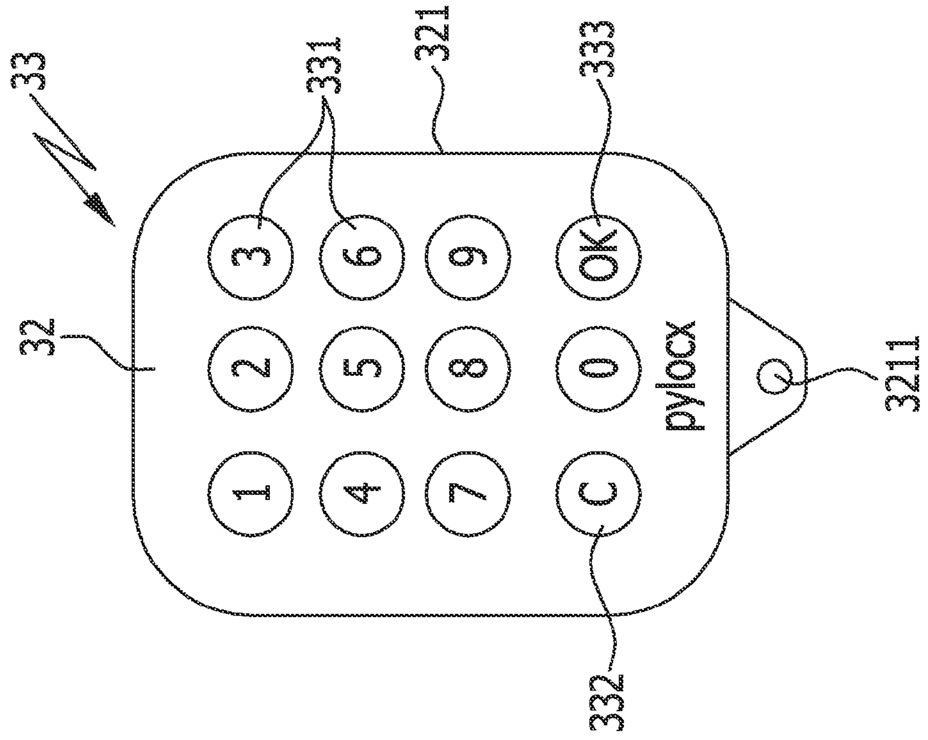

An exemplary embodiment of the invention is described hereinafter with reference to the drawing. This shows:

FIG. 1 a tubular key safe having an electronic lock integrated into a closure cap and a code characteristic of the electronic lock, FIG. 2 a flow chart which clarifies the transmission of the codes between a user and a central data processing centre, FIG. 3 the hand of a user when entering the authorisation code into an electronic key, FIG. 4 the use of the electronic key as a handle when opening the electronic lock, FIG. 5 the arrangement of a physical key on the inside of the closure cap of the tubular key safe, FIG. 6 a flow chart which illustrates the communication process between the user, a client computer, a server, an administrator and the electronic lock, FIG. 7 a diagram which illustrates the functions of the user, of the client computer, the server and the administrator FIG. 8 a schematic circuit diagram for an application of an electronic lock in conjunction with a control device and a motor lock, FIG. 9 a schematic front view of an electronic key, and FIG. 10 a schematic view of the rear face of an electronic key.

The closure device 10 illustrated in FIG. 1 is formed by a tubular key safe 12 which is arranged in theft-proof and force-resistant manner in a wall of a building or on a stable carrier in the vicinity of the building. The tubular key safe 12 is locked by means of a closure cap 14 on its front face. An electronic lock 16 is integrated into the closure cap 14 as is illustrated and described in detail in WO 2012/045474 A1 the disclosure of which is hereby incorporated in the present application.

As illustrated in FIG. 5, a physical key 18 by means of which at least one entrance to the not illustrated building and optionally further doors in this building can be opened is arranged on the inside of the closure cap 14.

A code 20 characteristic of the electronic lock 16 is arranged on the closure device 10 which is locked by means of the electronic lock 16. In the exemplary embodiment shown here, this code is in the form of a bar code 20, but it could also be in the form of an Aztec code or an invisible magnetic code. In the simplest case, the code 20 can be read out manually by a user 20. In accordance with one advantageous embodiment, a communication device 24 carried by a user 22 incorporates a sensor or a reading device for automatically acquiring the code 20. The communication device 24 can, for example, be formed by a smartphone the camera of which serves in conjunction with a stored application program ("App") for reading a bar code or alternatively an Aztec code which is used in the exemplary embodiment as a code 20 characteristic of the electronic lock 16. As has already been mentioned, codes 20 conveyed invisibly such as magnetically or by a radio signal can also be sent out by the electronic lock 16 or a device arranged in its proximity and received or read out by the communication device 24.

The electronic lock 16 is unlockable by means of an electronic key 32 insofar as an authorisation code 36 matching the electronic lock 16 is entered into this electronic key 32. FIG. 3 illustrates how the authorisation code 36 is entered by the user 22 via a keyboard arranged on the electronic key 32. Afterwards, the electronic key 32 can then be placed on the electronic lock 16 as shown in FIG. 4, and be used directly as a handle for opening the closure cap 14.

In accordance with the invention however, this process is preceded by the procedure that is illustrated in FIGS. 2, 6 and 7 wherein the user 22 transmits to a central data processing centre 30 such as the control centre of a security agency for example an item of information characteristic of the electronic lock 16 (the code 20) and an item of information characteristic of himself in the form of a code 26—in the form of a personal password or a letter/number combination for example—by means of the communication device 24. The item of information 20 characteristic of the electronic lock 16 and the item of information 26 characteristic of the personage of the user 22 together form a request data set 34 which, in the simplest case, is conveyed manually by means of a telephone call to the central data processing centre 30. In accordance with one advantageous embodiment of the invention, the transmission of the request data set 34 is automated, for example, in the form of a character string in a short text message (SMS) that is sent by the communication device 24.

The request data set 34 with the codes 20 and 26 contained therein is examined in the data processing centre 30 preferably using an additional comparison with a time parameter 28 (for example the roster or route plan of the user 22). Insofar as this examination leads to a positive result, the data processing centre 30 sends an authorisation code 36 to the communication device 24. In the simplest case, this may again be effected by a telephone call. In accordance with one advantageous development, the transmission of the authorisation code 36 to the communication device 24 is automated, for example, in the form of a character string embedded in a short text message (SMS).

As already mentioned in connection with FIG. 3, the authorisation code 36 is transferred to the electronic key 32 by the user 22 either manually via an input device, especially a keyboard, or, the authorisation code 36 is transmitted automatically by the communication device 24 to the electronic key 32. This transmission can be effected by equipping the communication device 24 with a transmitter and the electronic key 32 with a receiver communicating with this transmitter. For example, the transmission can take place using an infrared signal, Bluetooth or some other suitable close-range transmission protocol.

In accordance with a further development of the invention, the communication device 24 and the electronic key 32 can also be in the form of a structural unit which comprises a sensor for capturing the code 20, an input device for the code 26, a transmitting device for the transmission of the request data set 34 to the central data processing centre 30, a receiver for the receipt of the authorisation code 36 and a memory for storing the authorisation code 36 in the electronic key 32. The structural unit also contains software for detecting the codes 20 and 26, for the automated transmission of the request data set 34, for the automated receiving process and for the storage of the authorisation code 36.

The central data processing centre 30 advantageously comprises at least one client computer 310 and at least one server 320. The client computer 310 serves for the receipt of the request data set 34 and for transmission of this data set to the server 320. The data traffic between the client computer 310 and the server 320 is designated 315 in the Figures.

In the server 320, there are additionally stored time parameters 28 which, for example, illustrate a route plan of the user 22 with a characteristic time for the opening of the pertinent electronic lock 16, preferably including a suitable time buffer (earliest opening time, latest opening time, latest closure time). All the items of data in the server 320 are administered by an administrator 330. The data traffic between the server 320 and the administrator 330 is designated 325 in the Figures.

Preferably, a signal that is sent automatically by a transmitter installed in the electronic lock 16 upon the opening and closure of the electronic lock 16 is also conveyed to the server 320.

In one more developed embodiment and in contrast to the illustration in the FIGS. 2, 6 and 7, the method in accordance with the invention and the system in accordance with the invention can also function fully automatically without human interaction. The receipt of a request data set 34 by the client computer 310, the transmission of the request data set 34 to the server 320, the examination of the characteristic items of information (codes 20 and 26) contained in the request data set 34, the comparison with the at least one time parameter 28, the generation of an authorisation code 36 and the transmission of the authorisation code 36 to the communication device 24, if necessary again via the intermediary of a client computer 310, can all be effected fully automatically preferably under software control.

That the method and system in accordance with the invention for the secure provision of an access authorization and/or for the secure delivery of a key can also be effected fully automatically at the user end 22 has already been described in the context of the possible embodiments of the communication device 24 and the electronic key 32.

In accordance with the invention, the electronic key 32 is provided with an input device 33 by means of which the user 22 can enter into the electronic key the authorisation code 36 conveyed from the central data processing centre 30 to the communication device 24. An electronic key 32 provided with an input device 33 of this type is also generally usable in place of the widespread static input devices utilised today in which the entering of a code by an authorized user can be relatively easily observed by an unauthorized observer and thus represents a considerable safety risk. On the other hand, the entry of a code into a mobile electronic key 32 which is only used subsequently for opening an electronic lock can take place completely unobserved even at some distance from the electronic lock 16.

As in the exemplary embodiment shown here, a key 32 that is placed upon the electronic lock 16 and temporarily connected to the electronic lock 16 preferably by means of magnetic force can be used as an electronic key 32. The magnetic forces are provided by a magnet 329 in the central region of the electronic key 32 and by a mating magnet 161 in the central region of the electronic lock 16, said magnets preferably being in the form of permanent ring magnets which cater for automatic centering of the electronic key 32 with the electronic lock 16 and also for aligning the contacts 324, 325 and 326 relative to the concentric mating contact surfaces 164, 165, 166 on the electronic lock 16 independently of their relative angle.

Likewise however, electronic keys 32 in the form of a transponder for example which cooperate in contact-less manner over a certain distance with the electronic lock 16 are usable.

The electronic key 32 comprises a housing 321 having the input device 33 arranged upon the front face thereof in accordance with FIGS. 3 and 9. In the exemplary embodiment shown here, the input device is a numeric keyboard with 10 digit keys 331, an erase key 332 ("C") and an enter key 333 ("OK"). On the rear face of the housing 321, there project out three contacts 324, 325 and 326 which are spring mounted in the housing, and of these, the centrally arranged contact 325 for example carries the plus voltage, the outermost contact 324 provides the earth connection and contact 326 serves for serial data transmission.

In the rear view of the electronic key 32 in accordance with FIG. 10, there is also indicated the cover of a battery compartment 327 behind which an accumulator 332 is arranged. This for example, is in the form of a lithium ion accumulator having an output voltage of 3.7 V.

A voltage transformer in the form of a DC/DC converter 323 is arranged in the electronic key 32 for increasing the output voltage to 12 V for example.

Furthermore, the electronic key 32 is provided with at least one interface 328 which in the present case for example is formed by a micro USB interface and serves for programming the electronic key 32 and optionally also for charging the accumulator 322.

The electronic key 32 co-operates with either the electronic lock 16 such as a tubular key safe 12 for example that is shown in FIGS. 1 to 5 or a protected area or some other device requiring access authorization. Here, the term "device" is to be interpreted very widely. The devices may be machines, vehicles or the like, but could also be lockers, safe-deposit boxes or safes or doors to security areas that are to be protected by an electronic lock 16.

The example in accordance with FIG. 8 shows that the protected device can be released not only directly, but also indirectly by the electronic lock 16. In this case, the electronic lock 16 works as a 220 V protective module for a not illustrated protected device which is eventually released by the actuation of a motor lock 40.

In this case, yet another control device 50 is arranged between the electronic lock 16 and the motor lock 40, wherein this device is adapted to be powered by its own voltage supply but is only activated by the actuation of the electronic lock 16. After the transmission of a valid authorisation code 36 from the electronic key 32 that is not illustrated in FIG. 8 via the mating contact 166 responsible for the transmission of data, the external voltage supply in the control device 50 is activated and actuates the motor lock 50. On the other hand, the voltage needed for operating the control device 50 is provided by the electronic key 32 via the electronic lock 16 for the phase involving the examination of the authorisation code 36. A more detailed description of the control device 50 follows at the end of the description.

The advantage of an indirect actuating process is that if the protected device is not being used then an operating voltage does not have to be applied thereto. This can be initialised when required at any time by the electronic key 32 via the electronic lock 16.

In place of the three contacts 324, 325 and 326 of the electronic key 32 and the three mating contacts 164, 165 and 166 of the electronic lock shown here, two of these contacts are sufficient in the case of a modification wherein the data transmission process is effected simultaneously over the earth contact for example.

A lithium ion accumulator 322 having an input voltage of 3.7 V can briefly provide an output power of 7 Watts by means of a high efficiency DC/DC converter having an output voltage of 12 V. The capacity of the accumulator 322 is then enough for approx. 700 opening actions without being recharged. An under-voltage protective device preferably signals to the electronic key 32 by means of a diode and/or a buzzer that the accumulator voltage has fallen to 2.7 V for example, so that recharging of the accumulator 322 must take place before it can be further employed.

It is also advantageous to provide a not illustrated capacitor in the control device 50 for buffering the energy conveyed by the electronic key 32. The capacitor is charged during or immediately after examination of the access authorization and then it alone effects the subsequent opening or release process using its stored charge capacity. The capacitor ensures that the electronic lock 16 does not remain hanging in an intermediate position during an opening process in the event of inadequate residual capacity of the accumulator 322.

By using parts from the mobile telephony field, the electronic key, the electronic closure system and the method in accordance with the invention are realizable in an economical manner.

Description of the Control Device 50:

Functional Modules

The control electronics can be divided into 5 sub-function modules:

- micro-controller with memory and a reset controller
- identification module with timer and signalling function
- switching stage and fixed voltage outputs
- current supply
- DC/DC converter (when this module is used, the external current supply is dispensed with!)

Micro-Controller with Memory and Reset Controller:

A PIC micro-controller from the company Microchip is used for the central control system and the evaluation of all the exchanges of information between a Pylocx system key (electronic key 32) and the control device 50 inclusive of the control of the motor lock 40. In this connection, power consumption, high integration density, economics as well as the great experience with the PC assembler play the crucial role. In order to store data in non volatile manner, the micro-controller communicates over an $I^2C$ bus with an EEPROM at 256 Kb.

A reset controller is utilised in order to switch the micro-controller on and off in a defined manner when switching on the current supply or in the event of short term interruptions of the voltage. This reset controller switches the micro-controller into the reset state at an operating voltage of <2.4V and removes the reset state at an operating voltage of >2.7V.

Identification Module with Timer and Signaling Function:

Each control module (control device 50) must possess an unambiguous, unique and unchangeable identification. The selected component from the DS Family of the company Dallas possesses such a ROM code and is thus outstandingly suitable. In addition, a real-time clock which is necessary for logging events is integrated into this component. Naturally, the real-time clock needs a continuous current supply for which reason a lithium button cell is used here. The lithium cell ensures a supply of current for the real-time clock for at least 10 years. The identification component communicates with the micro-controller using a micro-LAN protocol.

In order to inform the operator about the states of the control device 50, there is an integrated acoustic signal generator (piezo bleeper) which is very easy to hear even through the housing. If a remote signalling function should be desired, an acoustic and/or an optical signal source is connectable via the corresponding output. This external signalling function runs synchronously with the internal one.

Switching Stage and Fixed Voltage Outputs:

The control module (control device 50) has to be very versatile with regard to the motor locks 40 and electrical bolts that are to be attached. For this reason, a relay is selected as a potential-free change-over-switch for controlling the motor locks 40 or the electrical bolts. If a DC voltage is needed for controlling circuit elements, then a fixed voltage can be connected over the corresponding output by the potential-free change-over-switch. The fixed voltage output can be configured by means of a jumper (in the interior of the control device). There are 3 voltages to choose from: 6V, 9V or 12V each providing a maximum of 500 mA. The fixed voltages are stabilized and screened (residual ripple<20 mV).

Current Supply:

The control module (control device 50) is powered by mains voltage. A power unit in the form of an encapsulated switched-mode power supply is used. A fine fuse (200 mA, slow-acting) is provided in the primary circuit of the power unit for overload protection purposes. The fine fuse is located inside the control device 50. Input voltages of 110 to 250 V AC 50/60 Hz are connectable by appropriate circuitry in the switched power supply. The switched power supply delivers a 12 V DC output voltage, the 6 V DC and the 9 V DC are generated from the 12 V DC using a fixed voltage regulator (on the cooling plate).

In the event of a power failure, the control device 50 can be supplied with an external voltage (emergency power). For this purpose, a Pylocx emergency power unit is connected to the Pylocx contact point (electronic lock 16). The voltage of the internal battery (9V) of the Pylocx emergency power unit is thereby made available directly to the control module (control device 50) via the central contact 165 of the Pylocx contact point (electronic lock 16). The corresponding Pylocx transponder is then connected in this way to the emergency power unit. The further operation is the same as in normal operation. It should be taken into consideration that 12 V locks can only be supplied to a limited extent by the 9 V emergency power source. In like manner, the current is limited to 300 mA due to battery operation.

DC/DC Converter:

The DC/DC converter is activated over the emergency power input (innermost contact of the contact point) of the control device. The voltage (3.7 V DC) of the accumulator 322 being fed in here from the electronic key 32 is transformed up by the DC/DC converter to 12 V DC. This 12 V DC is supplied to the power supply unit of the control device. Instead of the 12 V DC that is generated by the switched power supply from the 230 V AC, this 12 V DC is now directly available for the internal electronics of the control device as well as for the activation of an external motor lock. Consequently, an external power supply is not necessary for the operation of the system.

Further Hardware Components in the Control Electronics:

A 5-pole contact strip is provided for loading the firmware of the micro-controller during the manufacturing process. A software update of the firmware can also be carried out via this contact strip. The contact strip is located directly on the printed circuit board of the control device 50 and is not accessible to the user. Moreover, EMV protection components are provided outwardly on the interfaces. The micro-LAN, the control inputs and the universal input are protected by suppressor diodes, the external signal output is protected by a VDR over voltage device. In order to increase the protective function, further elements for protecting the micro-LAN line and the operating voltage line are located on the printed circuit board. The micro-LAN line is protected by a further varistor. The emergency power line is likewise protected by a varistor. In addition, a Zener diode with PPTC is inserted for the protection of the DC voltage. By virtue of these measures, DC voltages (without current limiting) of up to 30V and static high voltages of up to 6 kV are reliably blocked. In order to block 220 V alternating voltage which can be fed in over the contact point, two gas discharge tubes in a separate housing can be connected between the control device 50 and the contact point (electronic lock 16). The mandatory blocking capacitors were taken into consideration.

LIST OF REFERENCES

10 closure device
12 tubular key safe
14 closure cap
16 electronic lock
161 mating magnet
164 mating contact surfaces
165 mating contact surfaces
166 mating contact surfaces
18 key
20 code (for 16)
22 user
24 communication device (of 22)
26 code (of 22)
28 time parameter
30 data processing centre
310 client computer
315 data traffic (between 310 and 320)
320 server
325 data traffic (between 320 and 330)
330 administrator
32 electronic key
321 housing
3211 attachment eye
322 accumulator
323 voltage converter (DC/DC)
324 contact
325 contact
326 contact
327 battery compartment
328 interface (e.g. micro USB)
329 magnet
33 input device (keyboard)
331 keys (alphanumeric)
332 erase key (Dear)
333 enter key (OK)
34 request data set
36 authorisation code
38 opening/closure signal (from 16)
40 motor lock
50 control device

The invention claimed is:

1. A method for secure acquisition of an access authorization or for secure delivery of a key for at least one user for opening at least one electronic lock device by at least one electronic key device carried by the user the electronic key device having at least two contacts for the transmission of data and energy to the electronic lock device and, the at least one electronic lock device is provided with at least two contacts for receiving energy and data from said electronic key device, comprising the following method steps:

transmittal of at least one item of information characteristic of the electronic lock device and the user to a central data processing centre that is remote from the electronic lock device by means of a communication device, examination of the sent information by the central data processing centre, transmittal of an authorization code to the user by means of the communication device in the case of a positive examination of the information, entry, of the authorization code into the carried electronic key device, bringing said electronic key device with its at least two contacts in contact with said at least two contacts of said electronic lock device, energizing said electronic lock device by said electronic key device and transmitting said authorization code to said electronic lock device for unlocking, unlocking of the electronic lock device of verification of such authorization code.

2. A method in accordance with claim 1, wherein the item of information characteristic of the electronic lock device is formed of a number combination or by a bar code.

3. A method in accordance with claim 1, wherein the item of information characteristic of the user is formed by a letter/number combination and/or a password.

4. A method in accordance with claim 1, wherein, before the transmittal of an authorization code to the user, the data processing centre examines the information characteristic of the electronic lock device and the user and in addition examines a time parameter for the place of use and the time of use that is linked to both items of information.

5. A method in accordance with claim 1, wherein said electronic lock device is arranged on a closure cap of a tubular key safe from which, after unlocking of the electronic lock device, a physical key for entering at least one further area is removable.

6. A method in accordance with claim 1, wherein the electronic lock device passes on a current for activating a motor lock that it received from an electrical voltage source in the electronic key device to said motor lock.

7. A method in accordance with claim 1, wherein the electronic lock device passes on a current for activating a control device that it received from an electrical voltage source of the electronic key device to said control device.

8. A method in accordance with claim 1, wherein the electronic lock device and/or the electronic key device released thereby sends an item of information to the central data processing centre upon the activation and/or the deactivation thereof.

9. A method in accordance with claim 1, wherein a mobile telephone is used as a communication device for the transmittal of the at least one item of information characteristic of the electronic lock device and the user and/or for the reception of the authorization code.

10. A method in accordance with claim 1, wherein the communication device is provided an application program by means of which the at least one item of information characteristic of the electronic lock device and the user is detectable and by means of which the code is receivable.

11. A method in accordance with claim 1, wherein the communication device and the electronic key device form a unit.

12. A method in accordance with claim 1, wherein the authorization code is entered into the electronic key device by the user by means of an input device of said electronic key device.

13. A method in accordance with claim 10, wherein by means of the communication device the authorization code is transmissible to the electronic key device.

* * * * *